United States Patent [19]

Hammar et al.

[11] Patent Number: 4,673,539

[45] Date of Patent: Jun. 16, 1987

[54] PROCESS FOR THERMOFORMED ARTICLES

[75] Inventors: W. James Hammar, St. Paul; Ronald F. Ofstead, Maplewood, both of Minn.

[73] Assignee: Minnesota Mining and Manufacturing Company, St. Paul, Minn.

[21] Appl. No.: 735,379

[22] Filed: May 17, 1985

Related U.S. Application Data

[63] Continuation-in-part of Ser. No. 500,784, Jun. 3, 1983, abandoned.

[51] Int. Cl.$^4$ .............................................. B29D 11/00
[52] U.S. Cl. ...................................... 264/1.1; 264/2.6; 264/2.7; 264/320; 264/331.14; 526/245
[58] Field of Search ............ 264/1.1, 2.7, 320, 331.14, 264/284, 293, 2.6; 526/245

[56] References Cited

U.S. PATENT DOCUMENTS

| | | | |
|---|---|---|---|
| 2,436,144 | 2/1948 | Howk et al. | 260/87 |
| 2,464,120 | 3/1949 | Dickey et al. | 526/245 |
| 3,220,960 | 11/1965 | Wichterle et al. | 260/2.5 |
| 3,361,858 | 1/1968 | Wichterle | 264/1 |
| 3,391,130 | 7/1968 | Bolstad et al. | 526/292.1 |
| 3,470,124 | 9/1969 | Van Eygen et al. | 260/29.6 |
| 4,081,600 | 3/1978 | Kueneman et al. | 264/320 |
| 4,257,842 | 3/1981 | Ciarcia et al. | 264/284 |
| 4,528,325 | 7/1985 | Ofstead | 526/245 |

FOREIGN PATENT DOCUMENTS 56-116  1/1981  Japan .................................. 264/293

OTHER PUBLICATIONS

*Dictionary of Plastics*, Wordingham et al, Newnes Books, 1968, pp. 168–169.
*Whittington's Dictionary of Plastics*, Whittington, Technomic Publishing, 1968, p. 221.
Harris, et al., J. Pol. Science, Part A-1, 4, 665–677.

*Primary Examiner*—James Lowe
*Attorney, Agent, or Firm*—Donald M. Sell; James A. Smith; Lorraine R. Sherman

[57] ABSTRACT

A process for preparing shaped articles and shaped hydrogel articles including ophthalmic devices comprises the steps of preparing a polymer or copolymer comprising units derived from an ethylenically-unsaturated monomer bearing at least one trihaloacetoxy-substituent group, thermoforming said polymer by heating in a mold or in sheet-form at a temperature in the range of 100° to 400° C. for about 5 seconds to 15 minutes, and then cooling said polymer, to provide a shaped article, optionally, solvolyzing the resulting shaped article to provide a hydroxy-substituted polymeric shaped article, and optionally hydrating said hydroxy-substituted polymeric shaped article to provide a shaped hydrogel article.

15 Claims, No Drawings

PROCESS FOR THERMOFORMED ARTICLES

This application is a continuation-in-part of application Ser. No. 500,784, filed June 3, 1983 now abandoned.

FIELD OF THE INVENTION

This invention relates to thermoformed articles and a process for preparing such articles from thermallyprocessable polymers. In another aspect, it relates to shaped hydrogel articles including ophthalmic devices.

BACKGROUND ART

Polymers containing free hydroxyl groups are well-known to the art, and are useful for a variety of purposes. For example, polymers such as poly(vinyl alcohol) and poly(hydroxyethyl methacrylate) are well known. Some polymers containing hydroxyl groups, such as poly(vinyl alcohol) form excellent hydrogels, i.e., they absorb large amounts of water without dissolving. Hydrogels have desirable physical, optical, and physiological properties and are useful, for example, as contact lens materials. However, in order to obtain properties of strength and structural integrity, these polymers are generally cross-linked. See, for example, U.S. Pat. Nos. 3,220,960 and 3,361,858. It is known in the art that the strength of these polymers is generally related to the amount of cross-linking present.

It is also well-known that hydroxyl-containing polymers, due to extensive hydrogen bonding interactions, are generally not moldable into shapes with structural integrity, that such polymers are generally considered infusible and non-thermoplastic, and that they undergo thermal degradation before temperatures allowing melt-flow (i.e., melting without degradation) are attained. Furthermore, cross-linked polymeric materials are generally not moldable into shaped articles since covalent bonds between polymer molecules do not allow unrestricted flow of polymers even at elevated temperatures. When the amount of cross-linking is extremely low, cross-linked polymers can sometimes be formed into films or other thin shapes, e.g., by solvent casting. It is recognized in the art that when the cross-linking in hydrogels is minimal, the strength is reduced.

In order to provide shaped articles having hydrogel properties from hydroxyl-containing monomers, the articles also possessing adequate strength and structural integrity, two processes are used in the art. One process requires forming a cross-linked polymer, cutting and machining the cross-linked polymer into the desired shape and configuration and then hydrating the article to provide a hydrogel article. This process utilizes labor-intensive cutting, machining, polishing, and the like. The other process, called spin casting is described, for example, in U.S. Pat. No. 3,408,429 and requires that polymerization in the presence of a crosslinking agent be carried out in a rotating mold which approximates the shape of the desired article. After polymerization the article is further processed if necessary to attain the final shape. The shaped article is then hydrated to provide a hydrogel article.

An early attempt to hydrolyze vinyl trifluoroacetate polymers is disclosed in U.S. Pat. No. 2,436,144 (see Example VIII). It is taught in the patent that the polymer obtained by hydrolysis is soluble in water, i.e., it is not a hydrogel. The polymers of polyvinyl trifluoroacetate obtained are described as colorless, transparent, tough and thermoplastic (col. 3, 11. 25-31). Further, the patent discloses molded articles of polyvinyl trifluoroacetate having softening temperatures of 70° C. Thus, the poly(vinyl trifluoroacetate) and its hydrolysis product of this patent are significantly different from that of the present invention.

Poly(vinyl trifluoroacetate) has also been hydrolyzed by other workers to poly(vinyl alcohol) in studies of the stereoregularity of poly(vinyl alcohol), e.g., Harris, et al., *J. Polymer Sci.*, Part A-1, 4, 649-677 (1966) and Pritchard, et al., *J. Polymer Sci.*, Part A-1, 4, 707-712 (1966). These authors did not preform the poly(vinyl trifluoroacetate) into shaped articles nor recognize the possibility or significance of doing so.

U.S. Pat. No. 3,470,124 describes monomers of the formula R'COO—Y—OOCR", wherein R'COO is a perfluoroalkanoic acid residue; R"COO is a residue of a polymerizable alkenoic acid; and Y is a residue of an organic compound selected from the group consisting of aliphatic, aliphatic-aromatic and aromatic dihydric alcohols as well as the functional derivatives thereof. The reference relates to maximizing the properties of the monomers and polymers obtained by incorporating fluorine into the acyl group in the materials. Thus, trifluoroacetoxyethyl methacrylate was not prepared, nor was its potential as a source of either poly(trifluoroacetoxyethyl methacrylate) or poly(hydroxyethyl methacrylate) appreciated.

Cross-linked and uncross-linked poly(vinyl alcohol) is known in the art. The properties of these forms of poly(vinyl alcohol) are known to differ as is disclosed in *J. Polymer Sci.*, 14, 441-457 (1976). Previous preparations of poly(vinyl alcohol) and shaped articles formed therefrom (see U.S. Pat. No. 3,361,858) do not exhibit the improved properties obtained in the shaped poly(vinyl alcohol) articles of the present invention.

SUMMARY OF THE INVENTION

Briefly, this invention provides a process for making shaped articles comprising thermoforming a trihaloacetate-protected polymer, then solvolyzing the thermoformed polymer, followed by hydrating it, to provide a hydrogel shaped article which can be an ophthalmic device with improved properties which may include improved structural integrity and improved strength.

Trihaloacetate-protected polymers are thermoplastic polymeric precursors to uncross-linked hydrogel polymers, and a solvolytic process followed by hydration transforms the molded precursor polymer into a shaped hydrogel polymer. Both strength and water sorbency in the absence of covalent cross-linking may be provided in certain examples by creating semicrystalline polymer hydrogels. These polymer hydrogels are suited for use as ocular or ophthalmic devices because they have extraordinarily high strength, flexibility, transparency, and are capable of absorbing large amounts of water which give high rates of oxygen permeability needed for corneal health.

As mentioned above, cross-linked poly(vinyl alcohol), although having good strength and hydrogel properties, is non-thermoplastic and cannot be molded into shaped articles such as ophthalmic devices. It has been discovered, surprisingly, that the polymeric compositions of this invention provide thermoplastic polymeric precursors to hydrogels which can be thermoprocessed to molded lens articles, then solvolyzed and subsequently hydrated to provide a molded hydrogel lens with high and controllable water sorbency characteristics.

It has not previously been recognized that the novel process of the present invention can provide articles with improved water absorption and in some instances improved strength even when compared to heavily cross-linked hydrogel polymers. The present process avoids both of the factors which can prevent thermal processability, i.e., hydrogen bonding by hydroxyl functional groups and cross-linking.

The present invention provides shaped hydrogels, and particularly shaped hydrogel ophthalmic devices, without using the step of machining or cutting a tough polymer, and thus provides a significant advantage in hydrogel processing.

The approach, materials, and processes described below are believed to represent a novel solution to achieving superior ocular or ophthalmic devices giving a desirable and surprising combination of properties.

As used in this application:

"ophthalmic devices" or "ocular device" means, for example, a contact lens, corneal transplant, corneal implant, or an intraocular lens;

"corneal transplant" means a replacement for all or part of a cornea which, at the time of transplant, is in contact with the external environment;

"corneal implant or lenticular prosthesis" means a prosthesis located within a cornea that is not in contact with the external environment;

"intraocular lens" means a replacement for the natural lens of an eye that is located posterior to the cornea;

"halo" means fluoro or chloro;

"trihaloacetate-protected polymer" means a polymer bearing trihaloacetate-ester groups, which when solvolytically removed provides a polymer bearing hydroxyl groups;

"solvolyzable" means a compound having at least one ester group which is capable of cleaving into a carboxyl-containing compound (e.g., amide, ester, or acid) and an alcohol in the presence of a nucleophile such as ammonia, organic amines, or water or in the presence of a lower ($C_1$ to $C_4$) alkanol (at temperatures up to 60° C.);

"solvolyzing" means reacting a solvolyzable compound as described above;

"hydrogel" means a material which absorbs water, in the range of 10 to 95 percent by weight, without itself dissolving;

"prehydrogel" means a polymer that can be solvolyzed to give a hydrogel;

"thermally processable (thermoprocessable) polymer" means a polymer which may be heated to a temperature in the range of 100° to 400° C., (i.e., these polymers have a softening temperature of at least 100° C.) and preferably in the range of 150° to 400° C. and most preferably at about 200° C., and then cooled to provide a shaped article such as an ophthalmic device which will retain its shape under ambient conditions;

"softening temperature" means the temperature at which substances without a sharp melting point change from viscous to plastic flow; and "solvent-coatable polymer" means a polymer which may be dissolved in a suitable solvent, which resulting solution may then be poured onto or over an article to be coated. The solvent is then evaporated, and the article dried. For some purposes, i.e., to obtain a hydrogel coating, the coating may be solvolyzed as described above, and then exposed to water to provide the desired hydrogel coating.

DETAILED DESCRIPTION

The present invention provides a process for preparing shaped articles comprising the steps:

a. preparing a polymer or copolymer comprising units derived from an ethylenically-unsaturated monomer bearing at least one trihaloacetoxy-substituent group;

b. thermoforming said polymer by heating in a mold or in sheet-form at a temperature in the range of 100° to 400° C. for about 5 sec. to 15 min., and then cooling said polymer, to provide a shaped article;

c. optionally, solvolyzing the resulting shaped article to provide a hydroxy-substituted polymeric shaped article; and d. optionally, hydrating said hydroxy-substituted polymeric shaped article to provide a shaped hydrogel article which can be an ophthalmic device.

This process has general applicability to all ethylenically-unsaturated monomers and polymers and copolymers thereof, the monomers being substituted by trihaloacetoxy groups and particularly trifluoroacetoxy groups, since that group is readily solvolyzed in the third step of the process. Some suitable ethylenically-unsaturated monomers include vinyl trifluoroacetate, trifluoroacetoxyethyl acrylate, trifluoroacetoxyethyl methacrylate, and substituted-propyl acrylate and methacrylate esters having the formulae

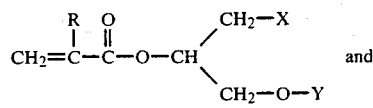 and

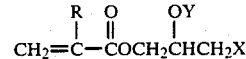

wherein R is hydrogen or methyl, X is fluoro, chloro, bromo, iodo, perhaloacetoxy or perfluoroalkylsulfonoxy of one to three carbon atoms, and Y is trichloroacetyl or trifluoroacetyl. Copolymers of the above monomers are prepared, for example, by reacting the above-described monomers with each other or with olefinic compounds such as vinyl esters, e.g., vinyl acetate, vinyl perfluoro-n-butyrate, vinyl formate and the like; vinyl ethers, such as vinyl tertiary-butyl ether; disubstituted ethylenes, e.g., derivatives of maleic, fumaric, itaconic and citraconic acid such as maleic anhydride, dimethyl itaconate, monoethyl fumarate, and the like and various monomers known to copolymerize with vinyl trifluoroacetate such as those described in column 6 of U.S. Pat. No. 2,436,144. Acrylate and methacrylate monomers described above form copolymers very readily with, e.g., methyl, ethyl, ethoxyethyl and propyl acrylate and methacrylate, and acrylamides and methacrylamides, styrenes, and the like.

When the copolymers are obtained and the comonomer does not contain a hydrophilic group, i.e., the comonomer does not contribute to the hydrophilic properties of the subsequently formed hydrogel, the amount of comonomer, i.e., the weight percent, will be a variable that must be controlled. Generally, in order to obtain greater water absorption in the subsequently formed hydrogel more of the protected hydroxyl-containing monomers will be used although, surprisingly, this is not true for poly(vinyl trifluoroacetate) (PVTA) copolymers. Usually the amount of protected hydroxyl monomer will be greater than 50 percent, and in the case of PVTA copolymers, the protected monomer will comprise 95 percent by weight or greater of the copolymeric composition. This will vary depending both upon the comonomer selected and the properties of the copolymer which are desired or acceptable.

Some of the presently preferred copolymers for use in the process of the invention are copolymers of vinyl trifluoroacetate with vinyl esters having up to 6 carbon atoms in the acid portion of the ester, particularly vinyl acetate, vinyl ethers having up to 8 carbon atoms, or di-substituted ethylenes such as esters or anhydrides of lower alkyl ($C_1$ to $C_4$) substituted or unsubstituted dicarboxylic acids having up to 8 carbon atoms, particularly maleic anhydride. These copolymers are particularly useful when the units of vinyl trifluoroacetate are present in an amount of at least 95 weight percent and preferably at least 98 weight percent and the units of comonomer are present in amounts of less than about 5 percent, and most preferred are amounts of less than about 2 percent.

Other suitable preferred copolymers include copolymers of trifluoroacetoxyethyl methacrylate with methyl and ethoxyethyl methacrylate and copolymers of 1,3-bis(trifluoroacetoxy)propyl-2-methacrylate with methyl methacrylate and ethoxyethyl methacrylate.

Some of the monomers useful for providing hydrogel properties in the ophthalmic device articles of the invention are known, while others are novel. The preparation of some novel monomers is described in the Examples. Two novel classes of polymeric material are included among materials useful in the process of the invention, namely, (1) amorphous polymers, illustrated by homopolymers of substituted-isopropyl acrylate and methacrylate esters, and copolymers with compatible ethylenically-unsaturated monomers (preferably at least 5 weight percent), which amorphous polymers are novel and are disclosed in assignee's copending patent application, U.S. Ser. No. 500,782, filed June 3, 1983, and (2) semicrystalline polymers, illustrated by copolymers of vinyl trifluoroacetate and 5 weight percent or less of vinyl ester or di-substituted ethylene comonomers, which are also novel, and are disclosed in assignee's copending patent application, U.S. Ser. No. 500,785, filed June 3, 1983.

Novel and useful trihaloacetyl-protected, e.g., trifluoroacetyl-protected polymers are obtained by polymerization of the monomers described hereinabove. The polymerization of the monomers may be carried out by employing initiators which generate free radicals on application of activating energy as is conventionally used in the polymerization of ethylenically-unsaturated monomers. Included among free-radical initiators are the conventional thermally activated initiators such as organic peroxides, azo compounds and organic hydroperoxides. Representative examples of such initiators include benzoyl peroxide, tertiary-butyl perbenzoate, diisopropyl peroxydicarbonate, cumene hydroperoxide, azobis(isobutyronitrile), and the like. Generally, from about 0.1 to 5 percent by weight of thermal initiator is used.

Photoinitiators may also be employed to initiate polymerization. Such initiators are well known and have been described, for example, in polymerization art, e.g., Chapter II of "Photochemistry" by Calvert and Pitts, John Wiley and Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether and $\alpha$-methylbenzoin; diketones such as benzil and diacetyl, etc., ketones such as acetophenone, $\alpha$, $\alpha,\alpha$-trichloroacetophenone, $\alpha,\alpha,\alpha$-tribromoacetophenone, $\alpha,\alpha$-diethoxyacetophenone (DEAP), methyl benzoylformate, 2-hydroxy-2-methyl-1-phenyl-1propanone, o-nitro-$\alpha,\alpha,\alpha$-tribromoacetophenone, benzophenone and p,p'-tetramethyldiaminobenzophenone; $\alpha$-acyloxime esters such as benzil-(O-ethoxycarbonyl)-$\alpha$-monoxime; ketone/amine combinations such as benzophenone/N-methyldiethanolamine, benzophenone/tributylamine and benzophenone/Michler's ketone; and benzilketals such as benzildimethylketal, benzildiethylketal and 2,5-dichlorobenzildimethylketal. Normally, the photoinitiator is used in amounts ranging from about 0.01 to 5 percent by weight of the total monomeric composition. When the quantity is less than 0.01 percent by weight, the photopolymerization rate becomes extremely low. If the photoinitiator is used in excess of 5 percent by weight, no correspondingly improved effect is observed. Preferably, about 0.1 to 1.0 percent of photoinitiator is used in the polymerizable compositions.

Polymerization may be carried out, for example, in bulk in a conventional manner. When the activating energy is ultraviolet light, the irradiation is typically carried out at a temperature of about 0° to 50° C. for 0.5 minutes to 5 hours or more. If the ultraviolet photoinitiator is thermally-sensitive, following ultraviolet irradiation, the composition may be heated at 50° to 100° C. to complete the polymerization.

When the activating energy is only heat, polymerization is usually carried out at a temperature from about 40° to 140° C. for 5 to 50 hours. The polymerization can also be carried out in stages. Thus, in a first stage, the composition may be heated at 40° to 60° C. for about 5 to 25 hours. In a second step the composition may be heated at a temperature in the range of 60° to 100° C. for several hours. It is to be understood, of course, that the polymerization conditions are not limited to such temperature and time conditions nor to the use of ultraviolet or heat as the initiating energy. Copolymers are preferably prepared by mixing compatible monomers with the monomers of the invention in the presence of the free radical catalysts and applying heat or UV irradiation as necessary to obtain the desired reaction rate.

In order to provide the desired geometry to the shaped articles which can be opthalmic devices, which is an aspect of the present invention, the solid polymers and copolymers are thermoprocessed (thermoformed). The polymeric materials are placed in molds of various desired shapes, e.g., contact lens molds, intraocular lens molds, corneal transplant or implant molds, or pressed into sheets or films of various shapes. The polymer-filled molds of various shapes are then heated, generally slightly above (10° to 20° C. above) the softening temperature of the polymer or copolymer to thermoform the polymeric sample. Using this technique shaped contact lenses, intraocular lenses, corneal implant lenses, corneal transplant lenses, and films, sheets and articles of various shapes can be obtained. Good retention of shape is observed when the molded polymer is solvolyzed or hydrolyzed to a hydroxyl-group substituted polymer. For example, if the polymeric articles are subsequently hydrated to form hydrogels, it is observed that the hydrogel articles retain their shape and indeed in some cases have excellent and improved strength compared to alternative materials. In some cases it may be desirable to machine or cut the thermoformed shaped articles to the exact geometry required.

Injection molding is an alternative method of molding which is useful to prepare shaped articles from the polymers and copolymers of the present invention.

Surprisingly, polymer hydrogels of poly(vinyl alcohol) prepared by the process of the present invention have two distinct improvements over related materials previously known. The strength of these hydrogels of the invention is much greater than that of known, conventional poly(vinyl alcohol) materials such as commercially available poly(vinyl alcohol) derived from poly(vinyl acetate) by alkaline hydrolysis. When films of the poly(vinyl alcohol) of the present invention are compared to films of commercially available poly(vinyl alcohol) in stress-strain measurements, the total energies to failure, i.e., the areas under the stress-strain curves show distinct differences between the polymer films. Over twice as much energy is required to cause failure of the poly(vinyl alcohol) film of the present invention. It is hypothesized that this difference in mechanical strength is related to differing intermolecular forces associated with the more highly syndiotactic stereochemical structure (i.e., the stereochemical configurations of the tertiary carbon atoms are regularly alternating) associated with the polymers of the invention. Conventional polyvinyl alcohol has a more atactic structure (tertiary carbon atoms possessing a random stereochemical configuration) and its crystallinity properties are distinctly different.

A second major improvement is in the hydrogel properties of the polymers. Commercially available poly(vinyl alcohol) derived from poly(vinyl acetate) generally displays water absorption levels of about 40 weight percent or less, depending on drying time and temperature of the polymer film used for hydration. Poly(vinyl alcohol) polymers of the present invention, and especially copolymers of poly(vinyl alcohol) containing as little as 1 percent or less by weight of various comonomers have water absorption values which may be controllably varied to give hydrogels which absorb much more water than these commercially available polyvinyl alcohol materials. Aqueous liquid absorption levels of 10 to 95, and preferably at least 50 to 70 weight percent are obtained with polymers of the present invention. It is theorized that ionic comonomers can lead to enhanced aqueous liquid absorption by affecting the crystallinity of the poly(vinyl alcohol) copolymer and by increasing the inherent absorptivity of the amorphous regions of the polymers. Non-ionic comonomers may exert their surprisingly large effects principally by affecting polymer crystallinity.

Once the shaped polymeric article has been thermoformed it is optionally, and in most cases preferably, hydrolyzed or solvolyzed to provide a shaped article of different chemical composition. The hydrolysis or solvolysis reaction is carried out under relatively mild conditions (i.e., less than 60° C.) using a nucleophile capable of displacing the trihaloacetyl group from the polymer. The nucleophile used is preferably a mild base, such as methanolic ammonium hydroxide or an organic amine (such as di-n-butylamine, morpholine or diethylamine). Ammonium hydroxide is the preferred nucleophilic reagent for the solvolysis step of this process. The base chosen will regulate the ionic character of the polymer when the polymer contains a carboxylic comonomer such as maleic anhydride.

The solvolysis reaction is carried out in a diluent which is not a solvent for the trihaloacetylated polymer, for example a diluent such as water, a lower alkanol e.g., ethanol or methanol, an ether e.g., diethyl ether or tetrahydrofuran, and the like.

The reaction time may be monitored analytically, e.g., chromatographically to determine both rate and completion of reaction. The solvolysis is preferably complete, and it is very rapid. For example, using 9:1 methanol:ammonium hydroxide as the solvolysis reagent, solvolysis is essentially complete in 15 minutes for most of the polymeric articles.

It is believed that in the cases of the poly(vinyl alcohol) polymers that the improved properties of the shaped ophthalmic hydrogel articles in the absence of cross-linking may be the result of the formation of semi-crystalline polymer hydrogels. In other materials other forces may be involved.

Materials of the present invention are particularly well-suited for use as ophthalmic devices (contact lenses, intraocular lenses, corneal transplants, and corneal implants) because of their optical clarity, biotolerance, hydrophilicity, compliance, low protein absorption, and chemical and physical stability under physiological conditions. In addition to hydrogel contact lenses (soft lenses), intraocular lenses, corneal implants, corneal transplants, molded tubes, e.g., as vascular prostheses and hydrogel coatings, may be prepared by the process of this invention.

Objects and advantages of this invention are further illustrated by the following examples, but the particular materials and amounts thereof recited in these examples, as well as other conditions and details, should not be construed to unduly limit this invention. Softening temperatures for crystalline and semicrystalline polymers (i.e., PVTA polymers and copolymers) are the same as the crystalline melt transition temperatures. Amorphous polymers (methacrylate or acrylate polymers) have broader ranges for softening temperatures.

EXAMPLE 1

A mixture of 50 g vinyl trifluoroacetate, 0.75 g vinyl acetate and 0.25 g of decanoyl peroxide was placed in an ampoule. The ampoule was sealed and maintained at 47° C. for about 16 hours, then at 57° C. for two hours. The product, poly(vinyl trifluoroacetate-co-vinylacetate) copolymer had a softening temperature of 180° C., was removed from the ampoule, pressed at 191° C. for about 1 minute into sheets and solvolyzed by treating with 10 percent ammonium hydroxide in methanol. The product was poly(vinyl alcohol-co-vinyl acetate) copolymer. The nuclear magnetic resonance spectrum of the copolymer was consistent with the assigned structure.

EXAMPLE 2

A mixture of 50 g vinyl trifluoroacetate, 0.75 g vinyl acetate, and 0.05 g 2-hydroxy-2-methyl-1-phenyl-1-propanone was placed in an ampoule. The ampoule was sealed and then rotated under an ultraviolet sunlamp for about three hours. Air was blown over the ampoule during the irradiation to cool it. The product, poly(vinyl trifluoroacetate-co-vinyl acetate) copolymer (softening temperature 180° C.), was removed from the ampoule and pressed into sheets at 191° C. (375° F.) for two minutes. The sheets were solvolyzed in 10 percent ammonium hydroxide in methanol for thirty minutes to provide poly(vinyl alcohol-co-vinyl acetate) copolymer.

EXAMPLE 3

A mixture of 5 g of vinyl trifluoroacetate, 0.030 g of maleic anhydride, and 0.025 g of azobisisobutyronitrile was placed in an ampoule, the contents of the ampoule were frozen with liquid nitrogen, the ampoule was degassed under a vacuum and then sealed. The ampoule was heated in a bath at 47° C. for about 16 hours. The contents of the ampoule were found to be white solid poly(vinyl trifluorocetate-maleic anhydride) copolymer having a softening temperature of 180° C.

EXAMPLE 4

The product of Example 3 was thermoformed by pressing between two polyester sheets at 180° C. (356° F.) for 0.75 minutes. A polymeric article with good strength was obtained. After cooling, the polymer film was placed in a flask and 20 ml of 10 percent concentrated ammonium hydroxide in methanol was added. After standing for 15 minutes, the polymer was separated by decanting the liquids, then dried in air to provide a poly(vinyl alcohol-maleic anhydride) copolymer in which the anhydride functional group had been converted to a carboxylate and an amide group. The copolymer was found to form a hydrogel when water was added, in that water absorption to a clear, strong elastic film occurred without dissolving the polymer sample.

EXAMPLES 5 to 10

Using the method of Example 1, vinyl trifluoroacetate was copolymerized with various monomers at a weight ratio of 99 to 1 to provide the copolymers (all having softening temperatures of 180° C.) shown in the examples of TABLE I:

TABLE I

| Example number | Comonomer | Copolymer |
| --- | --- | --- |
| 5 | dimethyl itaconate | poly(vinyl trifluoro-acetate-co-dimethyl itaconate) |
| 6 | monoethyl fumarate | poly(vinyl trifluoro-acetate-co-monoethyl fumarate) |
| 7 | vinyl perfluoro-butyrate | poly(vinyl trifluoro-acetate-co-vinyl perfluorobutyrate) |

Using the method of Example 4, the copolymers of the above examples were thermoformed, then solvolyzed and hydrated to provide the copolymers of TABLE II.

TABLE II

| Example number | Copolymeric starting material | Copolymeric product | Water* sorption (weight percent) |
| --- | --- | --- | --- |
| 8 | poly(vinyl trifluoro-co-acetate-dimethyl itaconate) | poly(vinyl alcohol-co-dimethyl itaconate) | 47 |
| 9 | poly(vinyl trifluoro-acetate-co-mono-ethyl fumarate) | poly(vinyl alcohol-co-monoethyl fumarate) | 58 |
| 10 | poly(vinyl trifluoro-acetate-co-vinyl perfluorobutyrate) | poly(vinyl alcohol-co-vinyl perfluorobutyrate) | 42 |

*The water sorption of the polymers (percent $H_2O$) of TABLE II was a weight percent determination using the formula
percent $H_2O = [(W_2-W_1)/W_2] \times 100$
wherein $W_2$ is a water-swollen sample weight and $W_1$ is a dry sample weight.

EXAMPLE 11

To a solution of 18.0 g of trichloroacetyl chloride in 100 ml of chloroform was added 14.2 g glycidyl methacrylate. The solution was warmed to 50° C., then stirred at 20° C. for 16 hours. The solution was then heated at reflux for 22 hours, the chloroform was removed by evaporation under vacuum to provide a mixture of 68 weight percent of 1-chloro-3-(trichloroacetoxy)propyl-2-methacrylate and 32 weight percent of 2-chlor-3-(trichloroacetoxy)propyl-1-methacrylate according to infrared and nuclear magnetic resonance spectral analyses.

EXAMPLE 12

Into a cold solution (ice bath) of 7.1 g (50 mmole) of glycidyl methacrylate in 100 ml of dichloromethane was bubbled 6.0 g (45 mmole) of trifluoroacetyl chloride. The solution was allowed to stand at 20° C. for 16 hours then evaporated to remove low boiling components. The residue was distilled in vacuo after the addition of 0.5 g methylene blue. Fractions boiling between 53° and 60° C. at 0.4 mm of Hg were analyzed by gas-liquid phase chromatography to show a single major component. Infrared and nuclear magnetic resonance spectral analyses confirmed the product to be 1-chloro-3-(trifluoroacetoxy)propyl-2-methacrylate.

EXAMPLE 13

To a cold solution (0° C.) of 25 g (120 mmole) of trifluoroacetic anhydride and 2 drops of trifluoroacetic acid in 100 ml of dichloromethane was added dropwise 14.2 g (100 mmole) of glycidyl methacrylate. The mixture was then allowed to warm to 20° C. and stirred for 20 hours. The solvent was removed by evaporation and the residue was distilled in vacuo to provide 1,3-bis(trifluoroacetoxy)propyl-2-methacrylate, b.p. 85° C./0.2 mm of Hg. The structural assignment was confirmed by infrared and nuclear magnetic resonance spectral analyses.

EXAMPLE 14

A copolymer of 99.5 weight percent vinyl trifluoroacetate and 0.5 weight percent maleic anhydride prepared according to the method of Example 2 was dissolved in acetone to give a 20 weight percent solution. The solution was cast onto a clear polyester film in sufficient thickness to give, after solvent evaporation, a clear film of approximately 0.4 mm (0.015 inches) thickness. This film having a softening temperature of 180° C. was placed in a metal mold designed to form a single contact lens, and the mold (heated at 200° C.) was closed under pressure (hydraulic ram pressure of approximately 1000 psi or 70 kg/cm²) for two minutes.

The mold was cooled and the molded lens was removed and placed in a container with 20 ml of 9/1 methanol/concentrated ammonium hydroxide for 15 minutes. The solvolyzed contact lens was then air dried and placed in distilled water. Hydration to a clear, flexible, very strong hydrogel lens (water sorption level 65 weight percent) occurred.

EXAMPLE 15

To a stirred solution of 6.0 g (19.4 mmole) of trichloroacetic anhydride in 25 ml of acetonitrile was added dropwise 1.4 g of glycidyl methacrylate. The reaction was stirred for 16 hours. The solvent was removed in vacuo and the product analyzed by nuclear magnetic resonance and infrared spectra. The analysis showed that the product obtained was 1,3-bis(trichloroacetoxy)-propyl-2-methacrylate.

EXAMPLE 16

To a stirred ice-bath cooled sample of 63 g of trifluoroacetic anhydride was added slowly 26 g of hydroxyethyl methacrylate. After stirring about 16 hours at 20° C. the solution was poured into a mixture of ice and diethyl ether. The ether layer was washed several times with ice water, then with cold saturated sodium bicarbonate solution until carbon dioxide was no longer evolved. The ether layer was then washed with cold sodium chloride solution and dried over magnesium sulfate. Evaporation of the ether provided 40.3 g of product. Distillation from methylene blue (2 g) provided 21.9 g of product, trifluoroacetoxyethyl methacrylate, b.p. 57°–58° C./3.0 mm of Hg. Chromatographic analysis showed 99 percent purity. Infrared and nuclear magnetic resonance spectral analyses confirmed the structural assignment.

EXAMPLE 17

To a mixture of 3.6 g of methyl methacrylate and 14.4 g of 1,3-bis(trifluoroacetoxy)propyl-2-methacrylate (prepared according to Example 13) was added 20 mg of diisopropyl percarbonate. Nitrogen was bubbled through the solution for 30 minutes. The solution was polymerized by heating at 60° C. for 4 hours in a Teflon container 1.26 mm in thickness. The resulting polymer had a softening temperature between 107 and 149° C. was thermally molded by holding at 149° C. (300° F.) for 10 minutes in a contact lens mold made of metal. The lens was placed in a stirred 1 M aqueous ammonium hydroxide solution for about 16 hours then rinsed with distilled water. The lens remained transparent and retained its shape.

EXAMPLE 18

A mixture of 12 g of 1,3-bis(trifluoroacetoxy)propyl-2-methacrylate (prepared according to Example 13), 1.5 g of methyl methacrylate, 1.5 g of ethoxyethyl methacrylate and 17 mg diisopropyl percarbonate was degassed by bubbling through nitrogen gas. A film cell consisting of two glass plates separated by a washer-like spacer of poly(tetrafluoroethylene) of about 12 mil (0.3 mm) thickness was filled with this solution and the mixture was polymerized at 60° C. for 4.75 hours. The film was placed in 1 M ammonium hydroxide solution and stirred for 26.5 hours. The film was then rinsed three times with distilled water and mixed in 0.9 weight percent sodium chloride solution for 18 hours. The weight percent hydration of the film was determined to be 40.6.

EXAMPLE 19

To a mixture of 3.6 g of ethoxyethyl methacrylate and 14.4 g of 1,3-bis(trifluoroacetoxy)- propyl-2-methacrylate (prepared according to Example 13) was added 20 mg of diisopropyl percarbonate. The solution was degassed with nitrogen and poured into a polymerization cell. Polymerization was carried out at 65° C. for 14 hours. The resulting polymer had a softening temperature between 107 and 177° C. and was thermoformed at 177° C. (350° F.) for five minutes. The article was placed in stirred 1 M ammonium hydroxide for 24 hours, then rinsed in distilled water for 24 hours, to provide a hydrated article which retains 64 weight percent water.

EXAMPLE 20

To 10 g of 1,3-bis(trifluoroacetoxy)propyl2-methacrylate (prepared as in Example 13) was added 30 mg of diisopropyl percarbonate. Nitrogen was bubbled through the solution. After 20 minutes the solution was injected into a film cavity with a 1.02 mm (40 mil) thick Teflon ® spacer. This container was placed in a 78° C. oven for 3.5 hours. The homopolymer film was then immersed in water on a steam bath for 22.5 hours. The water content was determined to be 82 weight percent.

EXAMPLE 21

To 17 g of trifluoroacetoxyethyl methacrylate (prepared as in Example 16) was added 25 mg of diisopropyl percarbonate. The solution was degassed with nitrogen and then used to fill a glass plate cell. The film was cured at 65° C. for four hours. The polymer film obtained from the cell had a softening temperature between 107° and 300° C. The film was pressed between two pieces of Teflon ® at 300° C. and was found to be thermoplastic.

EXAMPLE 22

A mixture of 8 g of 1,3-bis(trifluoroacetoxy)- propyl-2-methacrylate, 8 g of vinyl trifluoroacetate and 40 mg (0.25%) of diisopropyl percarbonate was degassed. The mixture was injected between two glass plates and heated at 38° C. for one day, then heated at 60° to 65° C. for two hours.

The film was soaked for 3.5 hours in 1M ammonium hydroxide solution, then rinsed thoroughly three times with distilled water. The film absorbed 85 weight percent water, had gas phase oxygen permeability of 48 $(cm^2)(ml\ O_2)/sec\ (ml)(mm\ )^2$, and flow conductivity of $9.7\times10^{-13}\pm0.5\ cm^2/sec.$ dynes and can be used as a corneal implant or intraocular lens.

EXAMPLE 23-PREPARATION OF AN INTRAOCULAR LENS

A soft intraocular lens material was prepared using the 98.5% of polyvinyl trifluoroacetate and 1.5% of polyvinyl acetate copolymer of the invention prepared as described in Example 2 by ultraviolet light induced copolymerization. A pair of disk shaped prostheses were cut with a diamond saw from disks of the dry polymer of about 0.2 mm thickness. The outside diameter of each disk was 14 mm. The dry disks were then solvolyzed using methanolic ammonium hydroxide to provide a poly(vinyl alcohol) copolymer. The disks were hydrated with distilled water to a water content of 70% and inserted into the posterior chamber of the right eye of a New Zealand white rabbit using standard medical techniques. The eyes were examined regularly using a slit lamp. After ten months the rabbit eye was observed to be healthy, the lens was clear, no evidence of tissue adherence was observed and the implantation was judged successful.

EXAMPLE 24- PREPARATION OF A CORNEAL IMPLANT

A sheet of hydrogel copolymer material of the invention was prepared and used as a source of corneal implant prosthesis material. The polyvinyl trifluoroacetate copolymer was prepared according to the method of Example 2 by ultraviolet light induced copolymerization. A pair of disk-shaped prostheses were cut from disks of dry copolymer with a diamond saw to a thickness of about 0.2 mm and a diameter of 7 mm. The dry disk was then converted to a polyvinyl alcohol-polyvinyl acetate copolymer hydrogel by methanolic ammonium hydroxide solvolysis. Each disk was hydrated to a water content of 70%. The disks were inserted into a pocket located midstroma about 0.24 mm below the epithelial layer of the eye of a New Zealand white rabbit. The pocket was closed using 10-0 nylon stitching for the sutures. The eyes were treated to prevent infection using standard techniques. After fifteen days the rabbit was sacrificed and the eyes examined for effects due to the implant. A slight pannus ingrowth was observed and the cornea was slightly translucent where it had been in contact with the posterior side of the implant due to the manipulation of the tissue to form a pocket. The anterior surface of the cornea above the implant was clear with no indication of extrusion. The implant was well tolerated in terms of not causing toxic effects.

EXAMPLE 25 - PREPARATION OF A CORNEAL IMPLANT

Using the method of Example 23 disks were obtained for implantation into the cornea of a primate. Disks were inserted into both eyes of the primate by cutting corneal pocket incisions and inserting the disks using standard medical procedures. The eyes were examined regularly using a slit lamp and were observed to heal in a satisfactory manner. After four months the animal was sacrificed and the eyes carefully examined. No infection, swelling or evidence of implant material extrusion was observed.

EXAMPLE 26 - PREPARATION OF VINYL(TRIFLUOROACETATE) HOMOPOLYMER

A mixture of 1 part vinyl trifluoroacetate monomer, 3 parts of Freon TM 113 (1,1,2-trichloro-2,2,1-trifluoroethane), and 0.0040 parts of 2-hydroxy-2-methyl-1-phenyl-1-propanone photoinitiator was placed in a glass vial and purged by bubbling carbon dioxide gas through the solution. The vial was sealed and irradiated for one hour using an ultraviolet lamp. This process was conducted at room temperature. The reaction mixture was filtered, the solid product was resuspended in 3 parts of Freon 113 and filtered again giving a white crystalline solid product, poly(vinyl trifluoroaetate), which was air-dried. Analysis by differential scanning calorimetry showed the crystalline melting transition for this polymer is complete at 180° C. and this represents the softening temperature.

EXAMPLE 27 - PREPARATION OF VINYL(TRIFLUOROACETATE) HOMOPOLYMER

A mixture of 551 grams of vinyl trifluoroacetate monomer, 4000 grams of Freon 113, and 35 ml of a 10% solution of dicyclohexyl peroxydicarbonate in Freon 113 was placed in a reactor equipped with stirrer and thermometer. The mixture was purged with nitrogen gas, the reactor was sealed, and stirred at 50° C. for 18 hours. The reactor contents, a white solid product suspended in Freon 113, were filtered, washed with Freon 113, and the solid product was dried in a vacuum oven to give a white solid crystalline powder product, the homopolymer of vinyl trifluoroacetate. Analysis by differential scanning calorimetry showed the crystalline melting transition for this polymer to be complete at 180° C. and this represents the softening temperature.

EXAMPLE 28-PREPARATION OF POLY(VINYL ALCOHOL) HOMOPOLYMER

Homopolymer of poly(vinyl trifluoroacetate) as prepared in Example 26 or 27 was dissolved in acetone to give a 20% solution of polymer. The solution was filtered and a film was prepared by evaporation of the acetone solvent. This film was treated for 2 hours in a solution of 10 parts concentrated ammonium hydroxide in 90 parts of methanol at room temperature, washed in fresh methanol and swollen in water to give a strong transparent poly(vinyl alcohol) homopolymer hydrogel of about 50 weight percent water. The hydrogel film had a refractive index of 1.42, a tensile strength of about 97 kg/cm$^2$, and was very well wetted by water as shown by a water droplet contact angle of just 24°. This film was found to be suitable for use as a corneal implant or intraocular lens.

EXAMPLE 29

A homopolymer of polylvinyl trifluoroacetate) was prepared using the procedure of Example 3 but using no comonomer. Thermoforming and then solvolysis according to the method of Example 4 provided a film of poly(vinyl alcohol) having the following properties:

| Weight percent water absorbed | Oxygen permeability* | Tensile strength (kg/cm$^2$) | Modulus (kg/cm$^2$) | Percent elongation |
| --- | --- | --- | --- | --- |
| 41 | 5.4 | 162 | 115 | 750 |

*The oxygen permeability (pO$_2$ of the ophthalmic devices of the present invention) was measured in accordance with the polarographic oxygen electrode method described by M. F. Refojo et al., "Permeability of Dissolved Oxygen Through Contact Lenses - 1. Cellulose Acetate Butyrate", Cont. Intraocular Lens Med. J. 3(4), 27 1977). The units of pO$_2$ are 10$^{-11}$ ml of O$_2$ · cm/sec · cm$^2$ · mmHg.

This film can be used to make an intraocular lens.

Various modifications and alterations of this invention will become apparent to those skilled in the art without departing from the scope and spirit of this invention, and it should be understood that this invention is not to be unduly limited to the illustrative embodiments set forth herein.

We claim:

1. A process for preparing a hydrogel precursor ophthalmic shaped article comprising the step:
   a. thermoforming an uncrosslinked polymer having a softening temperature of at least 100° C. comprising the product of an ethylenically-unsaturated monomer bearing at least one trihaloacetoxy-substituent group, by heating in a mold or pressing into sheets of films at a temperature in the range of 150° to 400° C. for 5 seconds to 15 minutes, and then cooling the resulting thermoformed polymer, to provide a thermoplastic, hydrogel precursor ophthalmic shaped article.

2. The process according to claim 1 wherein said monomer is vinyl trifluoroacetate.

3. The process according to claim 2 wherein said units of vinyl trifluoroacetate are present in an amount of at least 95 weight percent.

4. The process according to claim 1 wherein said monomer is trihaloacetoxyethyl acrylate or trihaloacetoxyethyl methacrylate.

5. The process according to claim 1 wherein said monomer is an isopropyl or n-propyl acrylate or methacrylate ester.

6. The process according to claim 5 wherein said units of isopropyl or n-propyl acrylate or methacrylate ester are present in an amount of at least 50 weight percent.

7. The process according to claim 1 wherein said polymer is obtained by copolymerization of said monomer with additional compatible ethylenically-unsaturated comonomers.

8. The process according to claim 7 wherein said comonomers are vinyl esters or disubstituted ethylenes.

9. The process according to claim 7 wherein said comonomers are (a) vinyl esters, (b) vinyl ethers, or (c) disubstituted ethylenes.

10. The process according to claim 9 wherein said comonomer is a disubstituted ethylene selected from the group consisting of maleic anhydride, dimethyl itaconate, and monoethyl fumarate.

11. The process according to claim 7 wherein said monomer is an acrylate or methacrylate and said comonomer is vinyl acetate, vinyl perfluoro-n-butyrate, vinyl formate, methyl methacrylate, ethyl methacrylate, ethoxyethyl methacrylate, or propyl methacrylate.

12. The process according to claim 7 wherein said monomer is vinyl trifluoroacetate and said comonomer is a vinyl ether.

13. The process according to claim 1 wherein said ethylenically-unsaturated monomer is present in an amount of 95 weight percent or greater.

14. The process according to claim 1 wherein said thermoforming process takes place at a temperature of about 200° C.

15. A process for preparing a hydrogel precursor ophthalmic shaped article comprising the step:
  a. thermoforming an uncrosslinked polymer having a softening temperature of at least 100° C. comprising vinyl trifluoroacetate present in an amount of at least 95 weight percent, by heating in a mold or pressing into sheets of films at a temperature in the range of 150° to 400° C. for 5 seconds to 15 minutes, and then cooling said thermoformed polymer, to provide a thermoplastic, hydrogel precursor ophthalmic shaped article.

* * * * *

UNITED STATES PATENT AND TRADEMARK OFFICE
CERTIFICATE OF CORRECTION

PATENT NO. : 4,673,539

DATED : June 16, 1987

INVENTOR(S) : Hammar et al.

It is certified that error appears in the above-identified patent and that said Letters Patent is hereby corrected as shown below:

Page 11, line 11 (Col. 6, line 48) delete "UY" and insert "UV"

Signed and Sealed this

Twenty-eighth Day of February, 1989

Attest:

DONALD J. QUIGG

*Attesting Officer*   *Commissioner of Patents and Trademarks*